United States Patent
Winkler (10) Patent No.: US 10,889,439 B2
(45) Date of Patent: Jan. 12, 2021

(54) SYSTEM FORMED BY SHELVING UNIT AND CORRESPONDING TELESCOPIC LOAD RECEIVING MEANS WITHOUT WIDTH ADJUSTMENT

(71) Applicant: SSI SCHÄFER AUTOMATION GMBH, Graz (AT)

(72) Inventor: Max Winkler, Graz (AU)

(73) Assignee: SSI Schäfer Automation GmbH, Graz-Gösting (AT)

( * ) Notice: Subject to any disclaimer, the term of this patent is extended or adjusted under 35 U.S.C. 154(b) by 366 days.

(21) Appl. No.: 15/674,650

(22) Filed: Aug. 11, 2017

(65) Prior Publication Data
US 2017/0341863 A1 Nov. 30, 2017

Related U.S. Application Data

(63) Continuation of application No. PCT/EP2016/051833, filed on Jan. 28, 2016.

(30) Foreign Application Priority Data

Feb. 11, 2015 (DE) .................. 10 2015 101 948

(51) Int. Cl.
*B65G 1/04* (2006.01)
*B66F 9/14* (2006.01)

(52) U.S. Cl.
CPC ............ *B65G 1/0435* (2013.01); *B66F 9/141* (2013.01)

(58) Field of Classification Search
CPC .................... B65G 1/0407; B65G 1/0435
(Continued)

(56) References Cited

U.S. PATENT DOCUMENTS 5,927,926 A * 7/1999 Yagi ................ B65G 1/0435
414/274
6,923,612 B2 8/2005 Hansl
(Continued)

FOREIGN PATENT DOCUMENTS

DE 4210892 A1 10/1993
DE 20213803 U1 4/2003
(Continued)

OTHER PUBLICATIONS

International Search Report for corresponding Patent Application No. PCT/EP2016/051833 dated May 9, 2016.

*Primary Examiner* — Saul Rodriguez
*Assistant Examiner* — Willie Berry, Jr.
(74) *Attorney, Agent, or Firm* — Renner, Otto, Boisselle & Sklar, LLP (57) ABSTRACT

A rack device including a storage and retrieval device for storing and retrieving storage goods in and from rack compartments. The storage and retrieval device includes a load-handling device having at least one gripping arm moveable in a depth direction of the rack compartments and including a gripping device for moving the goods along the depth direction. The gripping arm includes a first guiding device, and the rack device includes rack compartments. The rack compartments include a shelf and at least two depth supports extending along the depth direction and distanced from each other in a longitudinal direction, thereby defining a storage location. The depth supports include a second guiding device extending in the depth direction configured to cooperate with the first guiding device such that the gripping arm, during storage or retrieval, is in contact with and guided by the depth support via the guiding devices.

15 Claims, 5 Drawing Sheets

(58) Field of Classification Search
USPC .......................... 414/273, 274, 281, 785, 807
See application file for complete search history.

(56) References Cited

U.S. PATENT DOCUMENTS

| | | | | |
|---|---|---|---|---|
| 2006/0245862 | A1* | 11/2006 | Hansl | B66F 9/07 |
| | | | | 414/281 |
| 2011/0014018 | A1* | 1/2011 | van Ooyen | B65G 1/0435 |
| | | | | 414/280 |
| 2011/0142581 | A1 | 6/2011 | Freudelsperger | |

FOREIGN PATENT DOCUMENTS

| | | |
|---|---|---|
| DE | 10 2008 037 657 A1 | 2/2010 |
| DE | 10 2013 013 274 A1 | 2/2015 |
| EP | 2669217 A1 | 12/2013 |
| JP | S53 141769 A | 12/1978 |
| JP | H07 101508 A | 4/1995 |
| JP | 2008 013288 A | 1/2008 |
| WO | 03/018433 A1 | 3/2003 |
| WO | 2004/103883 A1 | 12/2004 |

\* cited by examiner

SYSTEM FORMED BY SHELVING UNIT AND CORRESPONDING TELESCOPIC LOAD RECEIVING MEANS WITHOUT WIDTH ADJUSTMENT

RELATED APPLICATIONS

This is a continuation application of the co-pending international application WO 2016/128227 A1 (PCT/EP2016/051833) filed on Jan. 28, 2016, and claiming priority of the German patent application DE 10 2015 101 948.5 filed on Feb. 2, 2015, both of which are fully incorporated herewith by reference.

BACKGROUND

The invention relates to a rack device as well as a load-handling device, which are adapted to each other and which respectively comprise a guiding device for supporting the load-handling device in a height direction during extracting and retracting a telescopic element into and from the rack device and for guiding same in a extracting and retracting direction. The invention further relates to a corresponding system.

RELATED PRIOR ART

The document DE 202 13 803 U3 discloses a storage device for storing and retrieving containers, or the like, respectively in and from a rack, preferably within an order-picking system, wherein the rack comprises a storage and retrieval device coupled thereto which has a moveable load-handling device which grips, or grabs, containers or the like, which are deposited on shelves of the rack, in an aligned position relative to the selected container, or shelf, and which retrieves the same from the rack, or conversely stores containers which are arranged on the load-handling device into the rack, wherein the load-handling device is a platform which is extractable and retrievable substantially horizontally and reaches slidingly beneath a container or the like.

The document DE 42 10 892 A1 discloses load-receiving devices which form a storage and retrieval device, in particular for motor vehicles in mechanical parking systems in terms of a high-bay warehouse. The load-receiving devices are equipped, depending on the type, with additional devices such as pallets, autonomously travelling special vehicles, travelling rails, special drives, or the like. The utilization of a simple and light load-receiving device without additional devices becomes possible if two telescopic lower parts, arranged in parallel, are arranged in a transversally displaceable manner on a moveable load carrier, each of which carries an upper part of a telescopic fork which guides a longitudinally moveable telescopic central part, if required, on which telescopic upper part two pairs of roller sledges having support rollers, which are overhanging at a load-receiving side, can travel longitudinally, are adjustable against each other for receiving the wheels of a to-be-parked motor vehicles, and are lockable. The upper parts of the telescopic fork can be supported, depending on a load put thereon and depending on a telescopic state, during a small inclination, which can be monitored by sensors, on supporting rollers, which are attached to ends thereof, in the track of the to-be-parked motor vehicle.

Systems are known which comprise racks and rack devices, which in turn are operated by storage and retrieval devices. The racks comprise rack compartments being arranged on top of each other and next to each other, in which rack compartments storage goods are stored. The storage goods can be stored in the storage locations single deep or multiple deep. The storage goods are stored and retrieved by means of load-handling devices. The load-handling devices are arranged on the storage and retrieval devices, which in turn can travel in a longitudinal direction of the racks from one of the rack compartments to another one of the rack compartments. The load-handling devices comprise at least one, typically two, gripping arms being extractable and retractable in a transversal direction of the rack, with which gripping arms the storage goods are moved into the rack compartments (storage) and from the rack compartments (retrieval). A corresponding system is disclosed in the documents DE 10 2008 037 657 A1 and EP 2 669 217 A1.

The gripping arms are cantilevered freely in an extracted state, i.e. without support on the rack, into the rack compartments. The guiding devices, which are required for this purpose, need to compensate on the one hand the weight forces of the extracted arm, which are increased by the leverage, and on the other hand virtually may not comprise any clearance in the horizontal direction. Therefore, the guiding devices of the telescopic arms of the load-receiving device are mechanically elaborated and cost intense.

The storage goods are pushed into the rack compartments, or retrieve from the rack compartments, by means of supporting pins. The supporting pins are typically mounted pivotablly about the longitudinal axis of the gripping arms as shown, e.g. in EP 2 669 217 A1.

Since the storage goods may have different widths, the gripping arms comprise a width-adjustment mechanism so that the gripping arms can be moved towards and away from each other, dependent on a width of the storage good. A corresponding width adjustment is also shown in the documents DE 10 2008 037 657 A1 and EP 2 669 217 A1.

Typically the storage goods are deposited on shelves of the racks. The shelves can be divided into storage locations dynamically. This means that each of the storage goods can have assigned, dependent on the situation, a storage-good specific area of the shelf. Thus, the size of the storage locations can be different. Position of the storage locations relative to the shelf changes again and again in a storage-good specific manner, thereby expressing the dynamic.

Further, the position of a storage good relative to the assigned storage location can change (inadvertently) during the course of time because, for example, the storage and retrieval devices are supported on the rack and in this manner vibrations are transmitted from the storage and retrieval devices to the racks, resulting in (slight) relative movements of the storage goods which are actually positioned statically. For this reason many known load-handling devices comprise a width adjustment for travelling coarsely to the storage locations, and for allowing the gripping arms to approach the stored storage goods in a fine-adjusted manner. Such width adjustments make the load-handling device expensive, complex (sensors/controllers), and heavy (additional components). The controlling effort for the coarse and fine positioning is high. The telescopic mechanics of the gripping arms need to be sufficiently stable for storing and retrieving heavy storage goods, in particular in a freely overhanging state.

SUMMARY OF THE INVENTION

Therefore, it is an object of the present invention to provide a rack device and a corresponding load-handling device overcoming the above-described drawbacks.

This object is solved by a rack device for storage and retrieval storage goods in and from rack compartments, wherein the storage and retrieval is performed automatically by means of a storage and retrieval device, wherein the storage and retrieval device comprises a load-handling device including at least one gripping arm, wherein the gripping arm is moveable, preferably only, in a depth direction of the rack compartments, and comprises a gripping device which allows the storage goods to be moved, in an active position of the gripping device, along the depth direction into the rack compartments and to be removed from the rack compartments, wherein the gripping arm comprises a first guiding device, wherein the rack device comprises: a plurality of rack compartments, wherein each of the rack compartments comprises a shelf and at least two depth supports extending along the depth direction, in particular in parallel to each other, and being arranged distanced to each other in a longitudinal direction of the rack compartments, thereby defining a, preferably multiple deep, storage location therebetween; wherein each of the depth supports comprises a second guiding device, which extends in the depth direction and which is configured to cooperate with the first guiding device of the gripping arm such that the gripping arm, during storage or retrieval, is in contact with the depth support via the guiding devices (64, 70) and is movable in the depth direction along the depth support. Preferably each of the depth supports projects, in particular perpendicular, from the shelf of the rack compartment (22) in a height direction (Y) for keeping the storage goods (26) laterally within the storage location (24).

The guiding devices of the gripping arms and the depth support are adapted to each other. The gripping arms are movable in a guided manner, due to the guiding devices, along the depth supports. The gripping arms are supported in a height direction by the guiding devices during storage and retrieval movements on the depth supports. Thus, the depth supports represent guiding and supporting aids. This support is advantageous in the maximally overhanging, or cantilevering, state of the gripping arms. In this situation the highest leverage forces occur. If in the maximally extended position of the gripping arms any leverage forces or torques acts on the load-handling device of the storage and retrieval device, an extending and retracting mechanism of the gripping arms can be constructed and dimensioned correspondingly easier. This in turn reduces the manufacturing costs as well as the weight of the load-handling device. The gripping arms can be made of simple materials including a lower loading capacity than materials used conventionally for the gripping arms. Stabilizing mechanics can be omitted.

Besides the guiding in the height direction the gripping arms are also guided in the depth direction (i.e. the transversal direction of the racks) of the rack compartments by the depth supports. Also this measure facilitates the construction of the gripping arms. The gripping arms, or moving mechanism thereof, in a width direction of the rack compartments do not need to be formed as stable as conventional mechanism.

The depth supports themselves limit the storage locations. Slipping of the storage goods within of the storage locations across predefined dimensions of a storage location, e.g. by vibrations being transmitted by storage and retrieval devices to the rack device, do not occur.

These measures allow simplification of the load-handling devices, resulting in significant cost reduction, in particular because width-adjustment mechanism for the gripping arms can be omitted.

Since the depth supports project from the shelves, movement of the storage goods is limited. Thus, the storage goods are always reliably within storage locations assigned thereto. Therefore, a corresponding sensor can be omitted with the load-handling device determining and verifying the relative position of the storage good within the rack compartment, or on the storage location, in particular upon retrieval.

Preferably, the first guiding device comprises a guiding wheel, or wheel, being rotatably supported on the gripping arm, wherein each of the depth supports includes topside having a groove, wherein the second guiding device includes the groove in which the guiding wheel is moveable in a guided manner.

The wheel and groove are adapted to each other and dimensioned such that the wheel sits, preferably form closed, at a little clearance within the groove and is movable. In this manner it is ensured that the gripping arm is extended and retracted along a desired direction. The wheel allows good force transmission and support, even during movement of the gripping arm.

Alternatively and/or additionally, the first guiding device can be a groove cam, wherein each of the depth supports includes topside having a groove, wherein the second guiding device includes the groove in which the groove cam is moveable in a sliding manner.

The groove cam represents an alternative to the above mentioned guiding wheel, wherein the groove cam is moved, in particular in a sliding manner, in the groove and does not unroll like a wheel.

In particular, each of the depth supports extends substantially across an overall depth of the storage location.

"Substantially across the overall depth" means that the depth support extends in the depth direction almost across the entire length of the storage location. Thereby it is ensured that the gripping arm, during one storage and retrieval cycle, is supported and guided permanently by the depth support. The gripping arm cannot leave a predetermined path of motion at any time.

In another advantageous embodiment the rack device further comprises a plurality of rack posts and a plurality of shelves, wherein the shelves are connectable to the rack posts along a height grid, and wherein each of the depth supports is connectable along a storage-location grid to each of the shelves.

A corresponding rack device is characterized by a body-on-chassis construction. The shelves can be hung into the rack post and changed at any time. With regard to spacing in the height direction arbitrary distances can be set between adjacent shelves. The size of the storage locations (width and depth) can be set easily and changed at any time by means of the depth supports. Thus, system operators can respond flexible at any time to changing requirements, in particular if an article assortment changes. Change of the article assortment results in that the dimensions of the storage goods change. In this case the dimensions of the storage locations can be adapted correspondingly by repositioning the depth supports. The operator does not need to buy new rack devices.

In this context it is of further advantage if each of the shelves comprises a plurality of slots, wherein each of the depth supports comprises a plurality of locking cams, wherein the slots are arranged along the storage-location grid, and wherein the slots and the locking cams are adapted to each other such that the locking cams are releasibly lockable in the slots.

The depth supports are inserted into the slots. Repositioning of the depth supports relative to the shelves is possible without problems. The repositioning can happen at any time. For the repositioning no special tool is required. Nevertheless the requirements to the guiding and positioning accuracy are satisfied for the load-handling device, or the extendable and retractable gripping arms thereof.

With another particular embodiment each of the depth supports comprises a, preferably linear, rail element and a, preferably wedge shaped, inserting element, wherein the inserting element is arranged flush adjacent to the rail element, and wherein the inserting element, with regard to its width, tapers towards a rack aisle.

The inserting element assists the storage of storage goods. Mechanical deadlock of the storage goods upon storage is prevented. The wedge shape, or inclined faces, of the inserting element cause centering of the to-be-stored storage goods towards storage locations assigned thereto. Sensors monitoring the storage process can be omitted. Otherwise this sensor is relevant, in particular for safety reasons.

In this case the rail element preferably comprises a groove, wherein the inserting element also comprises a groove, which transition flush into each other, wherein the groove of the inserting element preferably is broadened and declines towards the rack aisle.

The tapering of the groove of the inserting element towards the rail element has a centering effect for the first guiding device of the gripping arm. The inclination of the groove of the inserting element allows greater positioning inaccuracy of the gripping arm at the beginning of a storage or retrieval process in the height direction, since due to the ascending groove it is always ensured that the first guiding device of the gripping arm is inserted securely into the groove of the rail element.

Preferably, each of the depth supports comprises a width being greater than a width of the gripping arm.

Also this measure prevents that mechanical deadlock of to-be-stored storage goods occurs.

The above-mentioned object is further solved by a load-handling device having a second guiding device cooperating with the first guiding device of the rack device of the invention so that the gripping arm can securely store and retrieve the storage goods without width adjustment of the gripping arms into and from the storage locations.

The above-mentioned object is additionally solved by a system having at least one rack device and an LHD of the invention.

BRIEF DESCRIPTION OF THE DRAWINGS

It is clear that the above-mentioned and hereinafter still to be explained features cannot be used in the respectively given combination only but also in different combinations, or alone, without departing from the scope of the present invention.

Embodiments of the invention are depicted in the drawings and will be explained in the following description in more detail.

PREFERRED EMBODIMENTS OF THE INVENTION

If in the one following one speaks of vertical or horizontal orientations it is clear that elements, which are associated with these orientations, can be exchanged against each other at any time by a corresponding rotation so that corresponding orientations are not to be understood in a limiting manner. Further, identical parts and features are provided with the same reference numerals. The disclosures contained in the description are transferable roughly to parts and features having similar reference numerals. Position and orientation indications (such as "on top", "at the bottom", "lateral", "longitudinal", "horizontal", "vertical", or the like) refer to the just described figure. If the position or orientation is changed these indications are to be transmitted roughly to the new position and orientation.

As common in the field of (intra) logistics, in the storage and picking system, or system, 40 (distribution systems, material-handling systems, etc.) which is described hereinafter a longitudinal direction is designated by "X", a transversal direction is designated by "Z", and a height direction is designated by "Y". The directions X, Y, and Z preferably define a Cartesian coordinate system.

In the following a storage arrangement, or a rack arrangement, is to be understood as a plurality of racks 12 which are arranged in most cases in parallel in terms of single racks or double racks. Double racks are single racks which are installed back-to-back. The racks 12, which will be called also rack devices 10 hereinafter, extend substantially in the longitudinal direction X. Rack aisles 46 (cf. FIG. 2) extend in parallel to the racks 12 and extend transversally between the racks 12. The rack aisles 46 serve as an action space for storage and retrieval devices 42. The racks 12 end at (short) front faces which are respectively arranged oppositely, wherein the front faces in turn are orientated in a plane perpendicular to the longitudinal direction X, or to the (long) longitudinal sides of the racks 12, and to the rack aisles 46. The racks 12 as such comprise a plurality of storage locations 24 which are arranged in rack planes RE on top of each other. A rack line within a warehouse extends in the horizontal direction, and typically comprises many rack compartments 22 on top of each other and next to each other.

In the following storage good 26 is to be understood as storage and/or picking unit within the storage and picking system 40. The storage good 26 can include a storage-load support as well as an article. However, the storage good 26 can also include the article only, if the storage-load support is omitted. Pallets, grid boxes, containers, cartons, trays, or the like are used, for example, as (storage) load supports. An "article" is to be understood in particular as a piece good. The articles are the (smallest) units of an article assortment which articles can be distinguished by an article type. Piece goods are individualized distinguishable articles, which can be handled one by one, and an inventory thereof is listed by pieces or cases. A "case" is a general term, which designates a handable unit which can be moved manually or by means of technical equipment (such as conveying system, storage and retrieval device, load-handling device, etc.). The terms "article", "case", "storage good 26", "storage unit", "case", and "piece good" are used in the following equivalently.

The terms "rack location", "storage location 24", and "deposition location" are used in the following equivalently. These "locations" designate locations within the system 40 where the articles are stored. A "rack location", or a "storage location 24", is a location where the articles are provided within the rack device 10, even for longer times, for the purpose of picking. A storage-location administration is typically performed by a picking control, which is not shown and discussed in further detail here. The picking control is typically realized by a data processing system operating preferably in the online mode for delay free data transmission and data processing. The picking control can comprise a centralized or decentralized structure. The picking control can be structured by modules and can implement the following functions: order administration, implementation of picking-guiding strategies, resource-planning system, material flow, storage-location administration, interface administration, and the like. These functions are implemented by at least one of software and hardware.

Figure 1:
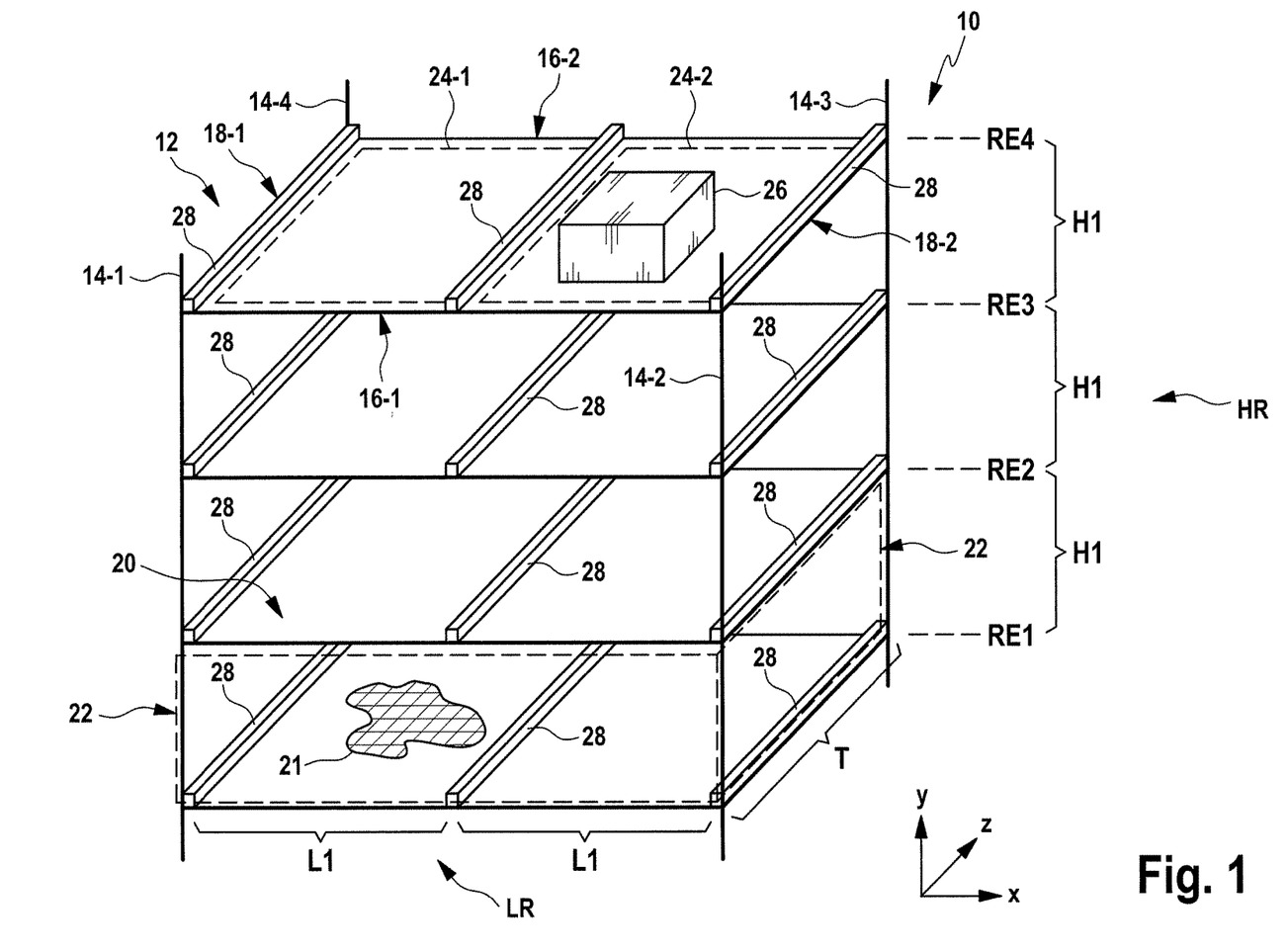
FIG. 1 shows a perspective view of a rack device of the invention.

FIG. 1 shows a perspective illustration of a rack device 10 of the invention. The rack device 10 shown includes a rack 12, which is structured, for example, by a body-on-chassis construction. The rack device 10, which is here exemplarily formed in body-on-chassis construction, comprises (rack) posts 14, (longitudinal) traverses 16 and (transversal) traverses 18. Optionally (rack) shelves 20 can be provided, which are hung into at least one of the traverses 16 and 18, or which are put thereon. The shelves 20 do not need to have a continuous area. The shelves 20 can be formed, for example, in terms of gratings 21 which are water-permeable. The shelves 20 can also be formed by multiple traverses 16 and/or 18 alone, which are arranged in parallel to each other.

In FIG. 1 four shelves 20 are exemplarily shown on top of each other, wherein the lowest shelf 20 of the rack 12, which defines a first rack plane RE1, is formed as a grating 21, and wherein the remaining shelves 20 of the rack planes RE2-RE4 are formed as shelves (of a continuous area), as known from conventional shelvings. The shelves 20 can be hung into locking noses, which are not shown in more detail and which are not designated, being attached to the posts 14. These locking noses are distanced to each other such that they define a height grid HR. In FIG. 1 the rack planes RE1-RE4 are equally distanced to each other by a distance H1 in the height direction Y.

In FIG. 1 also four rack compartments 22 are shown, wherein the lowest rack compartment 22 is illustrated by means of a dashed line. The rack compartments 22 define a space above the shelves 20.

Each of the rack compartments 22 can comprise a plurality of storage locations 24. In FIG. 1 each of the four rack compartments 22, which arranged on top of each other, respectively comprises a first (left) storage location 24-1 and a second (right) storage location 24-2, which are indicated in terms of dashed lines in FIG. 1 for the uppermost shelf 20 only. The storage locations 24 serve for storing respectively one or more storage goods 26 (single deep or multiple deep storage). In FIG. 1 one single storage good 26 is exemplarily shown in the storage location 24-2 in the uppermost rack plane RE4. The storage locations 24 respectively represent an area on which one or more of the storage goods 26 can be deposited. These storage goods 26 are assigned, in terms of data, to the stored, or to-be-stored, storage locations 24.

Each of the storage locations 24 is laterally limited in the longitudinal direction X of the rack 12 by means of at least one depth support 28, which will be explained in more detail below. The depth supports 28 can be formed in a rib-shaped manner and extend, in FIG. 1, in the transversal direction Z of the rack 12. Then in turn, between these depth supports 28, shelves 20 can be inserted next to each other, i.e. the shelves 20 are supported by the depth supports 28 and are not supported directly by the traverses 16 and/or 18. The storage locations 24 are defined between, preferably each, two depth supports 28 being arranged adjacent in the longitudinal direction X. In FIG. 1 the adjacent depth supports 28 are distanced to each other by a distance L1. Also, the storage locations 24 of FIG. 1 respectively comprise a "width" L1 as well as a depth "T". The "width" of the storage locations 24 can define a storage-location grid LR.

It is clear that the storage locations 24 can have different widths. The lowermost rack compartment 22 of FIG. 1 might be divided, for example, into four storage locations 24 (not shown) having different widths. For the sake of a simple description uniformly dimensioned storage locations 24 will be considered hereinafter.

Figure 2:
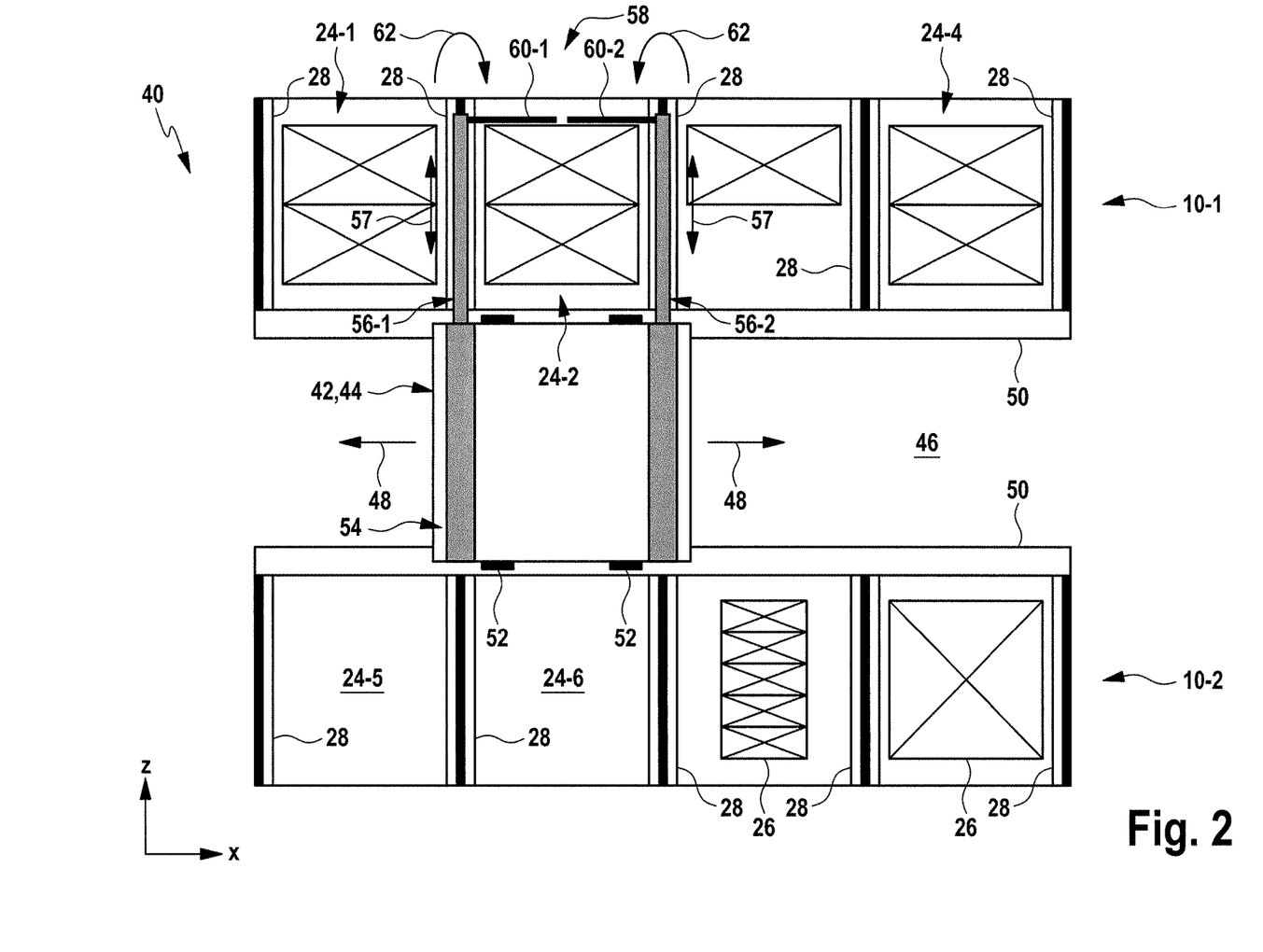
FIG. 2 shows a top view of a system of the invention.

FIG. 2 shows a top view of a system 40 of the invention which comprises one or more rack devices 10. The system 40 can be implemented by a storage and picking system, as described at the outset. The system 40 exemplarily comprises two rack devices 10-1 and 10-2, which are orientated along the longitudinal direction X and which define a rack aisle 46 therebetween in which rack aisle a storage and retrieval device 42 is moveable. The storage and retrieval device 42 is exemplarily implemented in terms of a one-plane storage and retrieval device, or shuttle, 44 (here without lifting functionality). It is clear that other types of storage and retrieval device can be used. The shuttle 44 moves along the arrows 48 in the rack aisle 46. The shuttle 44 is supported on travelling rails 50 which are attached to the rack devices 10-1. The travelling rails 50 are preferably attached at a height, of preferably each, of the rack planes RE. The shuttle 44 is supported on the rack devices 10, or the travelling rails 50, by means of the travelling wheels 52 thereof.

The storage and retrieval device 42, or the shuttle 44, comprises at least one load-handling device 54. The load-handling device 54 comprises at least one gripping arm 56 which can be extracted and retrieved in a telescopic manner in the transversal direction Z. The shuttle 44 comprises two gripping arms 56-1 and 56-2 being arranged in parallel to each other, which are shown in FIG. 2 in a (maximally) extracted state in which the gripping arms 56 reach into the rack device 10-1 for retrieving storage goods 26 being stored there. In FIG. 2 the gripping arms 56 reach into the second storage location 24-2 of the rack device 10-1.

The load-handling device 54 further comprises one or more gripping devices 58 which are exemplarily implemented in terms of pins 60 being mounted pivotablly on the gripping arms 56. Pivotal movement of the pins 60-1 and 60-2 is performed, for example, about the transversal direction Z and is indicated in FIG. 2 by means of arrows 62. The pins 60-1 and 60-2 preferably have a length such that they cover, in an activated state thereof being shown in FIG. 2, a width of the storage location 24-2, preferably almost completely. Long pins 60 have the advantage that differently dimensioned storage goods 26 can be deposited at arbitrary relative positions in storage locations 24, which are preferably formed and dimensioned uniformly, without risking that the deposited storage goods 26 cannot be retrieved again.

In FIG. 2 the pins 60-1 and 60-2 are positioned behind the rear storage good 26 of the storage location 24-2. The pins 60 are positioned at outer ends of the gripping arms 56. Pins 60 (not shown) being located further at the inside can be provided additionally. If the gripping arms 56 are retracted, i.e. move along the arrows 57 illustrating the telescopic motions of the gripping arms 56 towards the shuttle 44, the pins 60 pull the storage goods 26 being stored in the storage location 24-2 onto a transportation platform of the shuttle 44, which transportation platform is not designated in detail here and is located between the gripping arms 56. It is clear that further assisting elements (e.g., a platform being centrally extractable) can be provided for avoiding vertical tilting of the storage goods 26 during transfer from the storage location 24 onto the shuttle 44. These additional elements can also be telescopic in the transversal direction Z and can be arranged between both of the gripping arms 56-1 and 56-2.

Further, it is clear that storage process is performed similarly. In FIG. 2 further pins 60, which are not shown and designated in more detail, can be provided at an end portion of the gripping arms 56 oppositely to the end portion where the pins 60-1 and 60-2 are shown. By means of these additional pins 60 the storage goods 26 can be pushed into the storage locations 24 by the shuttle 44. Individual storage goods can be retrieved from a multiple occupied storage location 24.

Additionally, it is clear that the just explained pushing and pulling motions merely represent an exemplary way of transferring the storage goods 26 between the shuttle 44 and the storage locations 24. If the storage goods 26 are retrieved, for example, manually the load-handling device 54 is typically provided with a lifting functionality for hanging in and out the to-be-hung storage goods. In this case the gripping arms 56 are also telescopic in the transversal direction Z, but alternatively they comprise gripping devices (such as hooks, cams, or the like) for storing and retrieving the storage goods 26 in a hanging manner in the storage locations 24.

Also, the load-handling device 54 shown in FIG. 2 is of exemplary nature only. It is clear that the load-handling device 54 can be adapted to a type of the storage location 24. If the storage location 24, for example, comprises a corrugated shelf (not shown), wherein the storage goods 26 are deposited on corresponding ribs, the gripping arms 56 may alternatively be formed by telescopic prongs which can be extracted and retracted in interstices between adjacent ribs.

Figure 3:
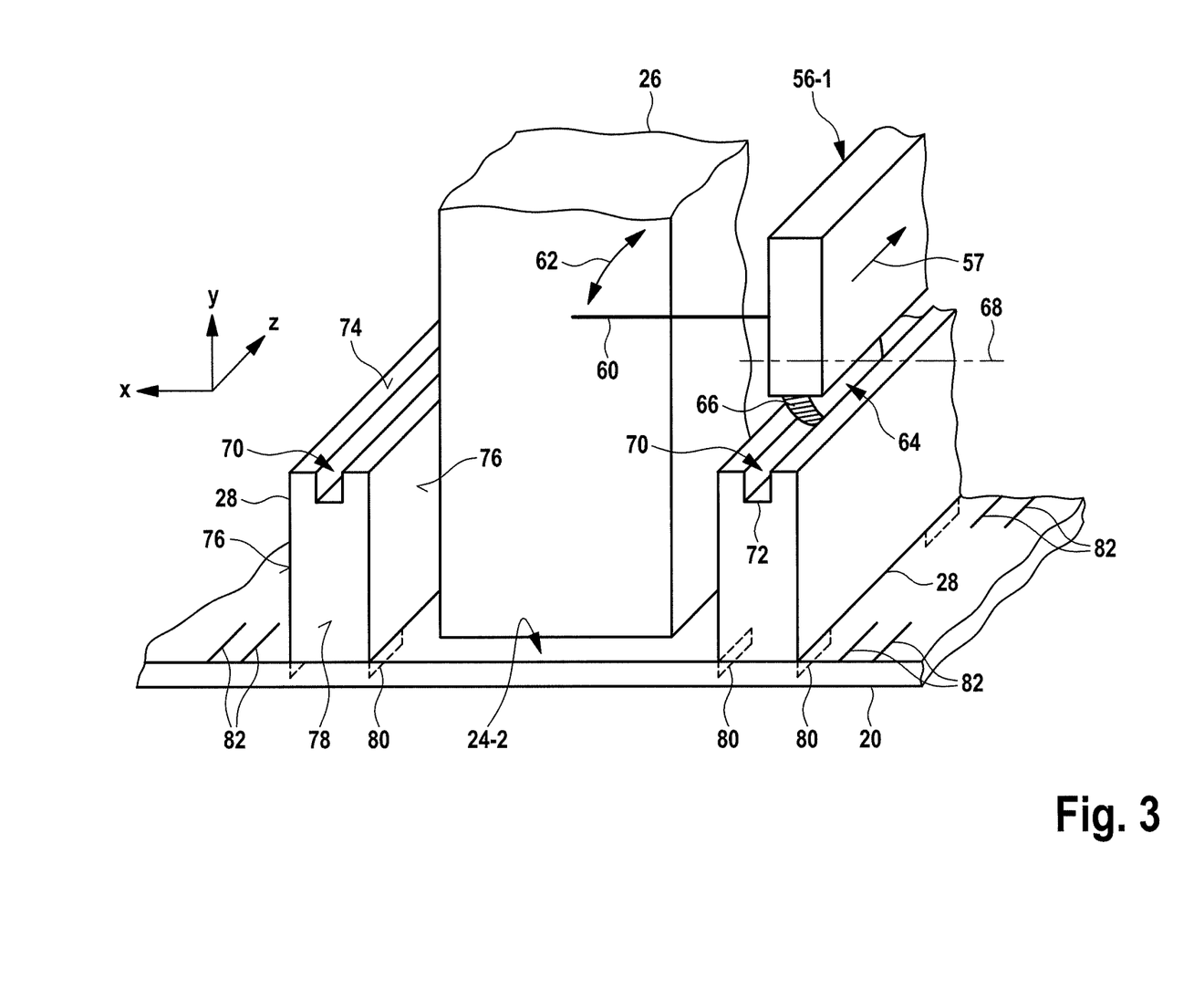
FIG. 3 shows a perspective rear view of a storage location.

FIG. 3 shows a perspective view of a retrieval process, wherein the storage location 24-2 of FIG. 2 is observed from the "rear". For simplification one single gripping arm 56-1 having an activated pin 60 is shown only, which pin is pivoted along the arrow 62 about the axis Z into an active position thereof. The gripping arm 56-1 is extracted so far that the pin 60 reaches behind the to-be-retrieved storage good 26 in order to move the storage good 26 by retracting the gripping arm 56-1 towards the storage and retrieval device 42 (not shown) as indicated by the arrow 57 in FIG. 3.

The gripping arm 56-1 comprises a first guiding device 64. The guiding device 64 exemplarily comprises a (guiding) wheel 66 mounted in or on the gripping arm 56-1. The wheel 66 is rotatable about a rotation axis 68 (driven or non-driven). The axis 68 is orientated in parallel to the longitudinal direction, or the axis X of the rack 12.

In general, at least one of the gripping arms 56 comprises the first guiding device 64. Preferably, each of the gripping arms 56 has a first guiding device 64 of its own.

In the detailed perspective view of FIG. 3 two of the depth supports 28 are shown in more detail. The depth supports 28 laterally limit the storage location 24-2 in the longitudinal direction X. The depth supports 28 define the storage location 24-2 between each other. The depth supports 28 project in the height direction Y from the shelf 20. Thereby the depth supports 28 prevent a to-be-stored storage good 26 from sliding unintentionally and in an undesired manner (laterally) in X from one of the storage locations 24 into one of the other storage locations 24.

Each of the depth supports 28 comprises a second guiding device 70 being formed corresponding to the first guiding device 64 of the gripping arms 56. In the example of FIG. 3 the second guiding device 70 is formed as a groove 72 in the topside 74 of the depth support 28. The groove 72 extends in the longitudinal direction of the depth support 28. In FIG. 3 the groove 72 extends in parallel to the transversal direction Z. The groove 72 represents a recess in the topside 74. The dimensions of the groove 72 are selected such that the guiding wheels 66 of the first guiding device 64 are moveable, preferably with a very little clearance, along the groove 72 as indicated by the arrow 57 in FIG. 3. In FIG. 3 the widths of the groove 72 and wheels 66, which are not designated in more detail, are adjusted to each other for moving the gripping arm 56 as linear as possible, i.e. without clearance in the direction X, along the groove 72. The groove 72 might also be provided in the lateral wall, or side, 76 of the depth support 28.

The grooves 72 in the depth supports 28 of FIG. 3 are formed end-side open, i.e. the groove 72 extends up to a front side 78 of the depth supports 28. The groove 72 can be formed end-side closed for preventing the gripping arm 56 from being extracted into an oppositely arranged rack aisle 46. The depth supports 28 can be formed in a rib-shape and can respectively comprise lateral sides 76 representing mechanical stoppers for the storage goods 26.

At a bottom side of the depth supports 28, which is not designated in more detail, one or more locking cams 80 can be provided, which are insertable into correspondingly formed slots 82 in the shelves 20. In this case the shelves 20 preferably comprise a plurality of slots 82 which are arranged in a distributed manner along the storage-location grid LR (cf. FIG. 1). In FIG. 3 the locking cams 80 are indicated by means of dashed lines.

It is clear that the depth supports 28 might also be formed integrally with the shelves 20. Further, it is clear that the depth supports 28 can also be connected in a different way, compared to FIG. 3, to the shelves 20. For example, the depth supports 28 can be adhered to the shelves 20 or can be welded to the shelves 20, or the depth supports 28 can carry the shelves 20. The plug connection shown in FIG. 3 has the advantage that the width of the storage locations 24 can be changed at any time for reacting in short term to new system requirements. For example, the depth supports 28 might also be pushed into correspondingly formed tongue-groove connections (not shown) in the shelves 20.

With common reference to the FIGS. 4 and 5 the following possible modifications and/or supplementations of the guiding devices 64 and 70 as well as the depth support 28 will be explained.

Figure 4:
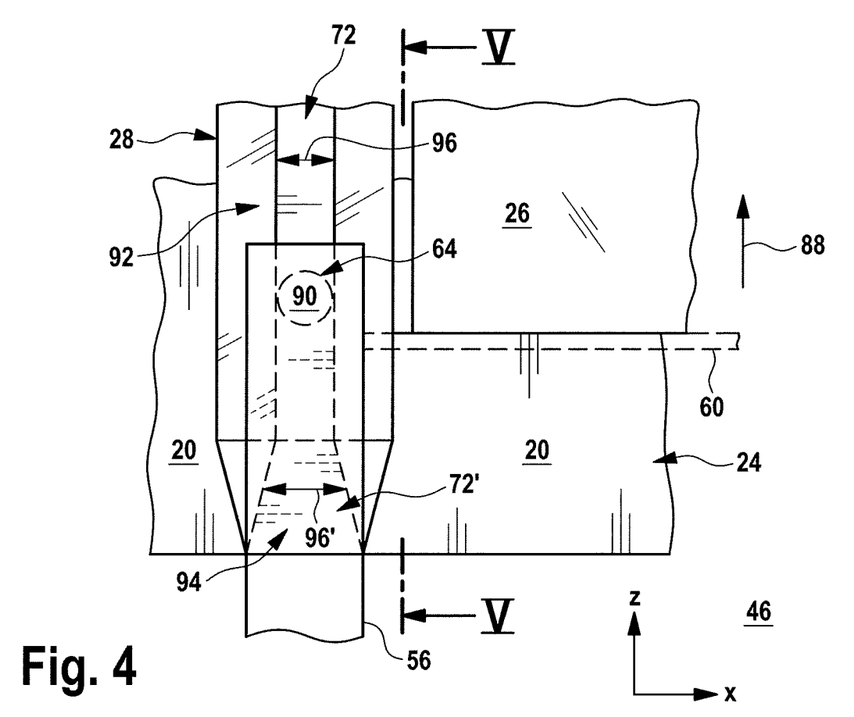
FIG. 4 shows a top view of a depth support.

FIG. 4 shows a top view of a part of a storage location 24, wherein the illustrated depth support 28 additionally comprises, at an aisle-side end thereof, an optional inserting element 94. FIG. 5 shows a partial sectional view of FIG. 4 along the line V-V in FIG. 4. The first guiding device 64 is implemented in terms of a groove cam 90, which is slidingly moveable in the transversal direction Z within the groove 72 of the guiding device 70 of the depth support 28. The FIGS. 4 and 5 show a storage process where the pin 60 pushes the storage good 26 into the storage location 24 along an arrow 88.

Figure 5:
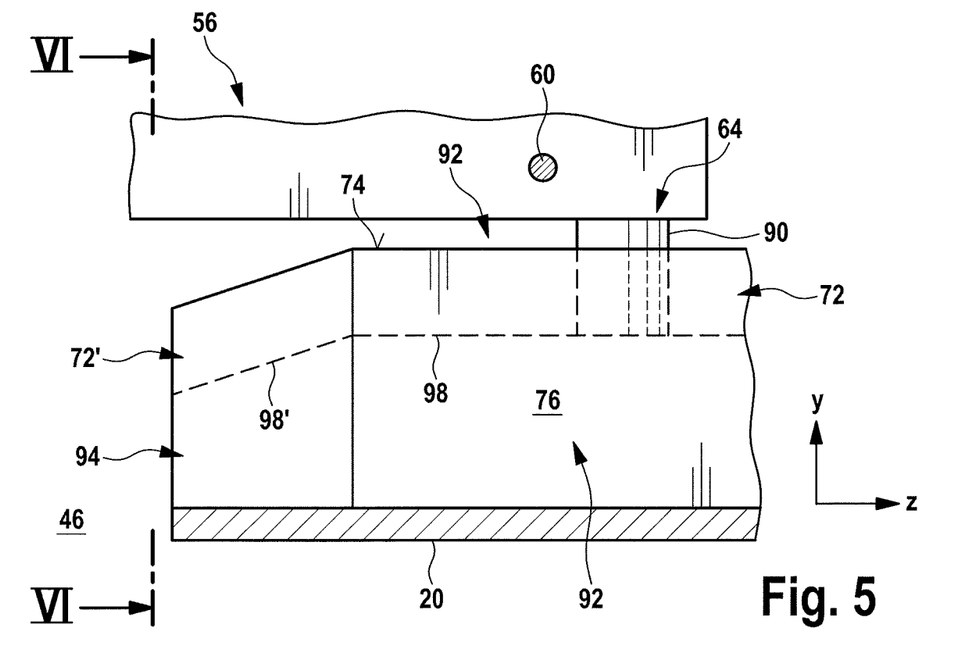
FIG. 5 shows a lateral view of the depth support of FIG. 4.

The depth support 28 shown in FIGS. 4 and 5 comprises a linear rail element 92 and an inserting element 94, which is provided at an entry side thereof and which is formed in a wedge shape. The wedge-shaped inserting element 94 is arranged flush adjacent to the rail element 92 at a rack-aisle side. The inserting element 94 tappers towards the rack aisle 46. Preferably, the inserting element 94 is formed symmetrically. The inserting element 94 continuous the groove 72 of the rail element 92 along the transversal direction Z. The groove 72 of the rail element 92 follows flush to a groove 72' of the inserting element 94. The groove 72 of the rail element 92 comprises a uniform groove width 96. The groove width 96' of the groove 72' of the inserting element 94 is preferably increased towards the rack aisle 46. A height of the inserting element 94, which is not shown and designated in more detail here, preferably decreases towards the rack aisle 46, whereas a height of the rail element 92 is preferably constant.

Similar applies to groove bottom 98, or 98'. The groove bottom 98 of the rail element 92 transitions flush into the groove bottom 98' of the inserting element 94. The groove bottom 98 of the inserting element 94 preferably declines towards the rack aisle 46.

The inserting element 94 terminates, preferably in a flush manner, at the shelve 20 towards the rack aisle 46.

The inserting element 94 takes care that during the inserting movement (cf. arrow 88) the to-be-stored storage good 26 does not collide with the depth support 28. The lateral flanks, which are not designated in more detail here, of the inserting element 94 which transition into the lateral sides 76 of the rail element 92 (FIG. 3) guide the to-be-stored storage good 26 during the motion (cf. arrow 88) along the transversal direction Z into the storage location 24. In this manner the storage good 26 is prevented from abutting against the front side 78 (cf. FIG. 3) of the depth support 28 and causing there a mechanical blockade during storage.

Due to inertia it can happen that the to-be-stored storage good 26 slides in the direction X against the gripping arm 56 while the shuttle 44 travels (at a higher velocity) in X within the rack aisle 46 or is stopped. Then a situation might arise where the to-be-stored storage good 26 is in contact with both the gripping arm 56 and the pin 60 during the inserting movement (cf. arrow 88). The wedge shape of the inserting element 94 guides the to-be-stored storage good 26 automatically in the direction X away from the depth support 28 so that mechanical blockades are avoided. The avoidance of the mechanical blockade thus happens without any relative displacement of the gripping arms 56 in the direction X.

The conically tapering groove width 96' of the inserting element 94 facilitates the insertion of the groove cam 90 into the trace 72 and 72', respectively. The positioning of the shuttle 44 relative to the storage location 24 can thus also happen with a certain uncertainty, i.e. coarse, in the direction X without making the cantilevering motion of the gripping arm 56 more difficult or preventing same. The tapering groove width 96' centers the groove cam 90 in the direction X during the inserting movement (see arrow 88). Similar applies for the groove bottom 98' of the inserting element 94. The groove bottom 98' increases in the direction Z to the level of the groove bottom 98 of the rail element 92. The groove bottom 98' guides the groove cam 90, i.e. in the height direction Y, to the level of the groove 72 of the rail element 92.

In the examples of FIGS. 4 and 5 the groove cam 90 is guided in a sliding manner. The groove cam 90 is formed of a corresponding material. The groove cam 90 supports the gripping arm 56 in the height direction Y during the inserting movement (see arrow 88). Of course, the groove cam 90 also guides the gripping arm 56 in the direction X and causes centering of the gripping arm 56 in the direction X, respectively.

It is clear that the effects described in the context of FIGS. 4 and 5 for the groove cam 90 also apply for each different embodiment of the first guiding devices 64 and 70, as exemplarily shown for the guiding wheel 66 and the groove 72 shown in FIG. 3.

Figure 6:
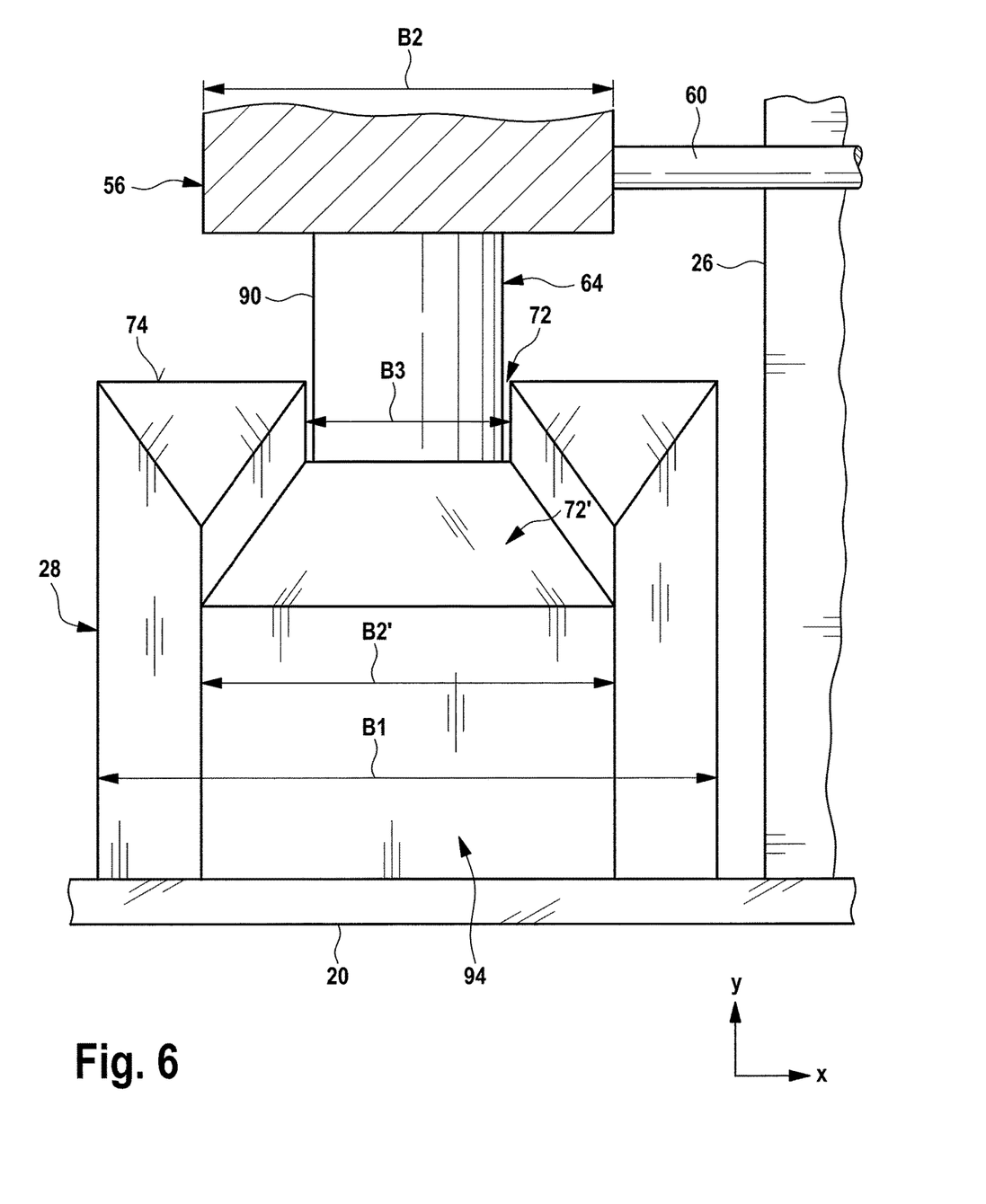
FIG. 6 shows a sectional view along a line VI-VI in FIG. 5.

FIG. 6 shows a sectional view along the line VI-VI of FIG. 5. FIG. 6 serves for illustrating the widths B, the first guiding device 64, the groove 72, the rail element 92, as well as the inserting element 94 in the direction X of the rack 12.

The (effective) width B1 of the rail element 92, or of the inserting element 94, is greater than the width B2 of the gripping arm 56 so that the storage good 26 cannot tilt, during insertion into the storage location 24, between the shuttle 44 and the depth support 28. The groove width B2' of the groove 72' in the inserting element 94 should be, at maximum, as large as the width B2 of the gripping arm 56. The width B3 of the first guiding device 64, here the groove cam 90, should be roughly as large as the groove width 96 (cf. FIG. 4) of the groove 72 of the rail element 92. The width B3 of the groove cam 90 should be slightly smaller than the groove width 96 so that the groove cam 90 has a small clearance in the direction X. The groove cam 90 is formed at a lower end thereof, preferably crowned for keeping the adhesive friction and sliding friction as small as possible.

Further aspects of the present invention are also reflected in the following clauses.

Clause 1. A rack device (10) for storing and retrieving storage goods (26) in and from rack compartments (22), wherein the storage and retrieval is conducted automatically by means of a storage and retrieval device (42), wherein the storage and retrieval device (42) comprises a load-handling device (54) having at least one gripping arm (56), wherein the gripping arm (56) is moveable, preferably only, in a depth direction (Z) of the rack compartments (22) and comprises a gripping device (58) for moving the storage goods (26), in an activated position of the gripping device (58), along the depth direction (Z) into the rack compartments (22) and for moving same from the rack compartments (22), wherein the gripping arm (56) comprises a first guiding device (64), wherein the rack device (10) comprises: a plurality of rack compartments (22), wherein each of the rack compartments (22) comprises a shelf (20) and at least two depth supports (28) extending substantially along the depth direction (Z), in particular in parallel to each other, and being arranged distanced to each other in a longitudinal direction (X) of the rack compartments (22) and thereby define a, preferably multiple deep, storage location (24); wherein each of the depth supports (28) comprises a second guiding device (70) extending in the depth direction (Z) and being configured to cooperate with the first guiding device (64) of the gripping arm (56) such that the gripping arm (56), during storage or retrieval, is in contact with the depth support (28) via the guiding devices (64, 70) and is moveable in a guided manner along the depth support (28) in the depth direction (Z).

Clause 2. The rack device (10) of clause 1, wherein each of the depth supports (28) projects from the shelf (20) of the rack compartment (22) in a height direction (Y) for holding the storage goods (26) laterally within the storage location (24).

Clause 3. The rack device (10) of clause 1 or 2, wherein the first guiding device (64) comprises a guiding wheel (66), which is mounted rotatably on the gripping arm (56), and wherein each of the depth supports (28) has a topside (74) including a groove (72), wherein the second guiding device (70) comprises the groove (72) in which the guiding wheel (66) is moveable in a guided manner.

Clause 4. The rack device (10) of clause 1 or 2, wherein the first guiding device (64) is a groove cam (90), and wherein each of the depth supports (28) includes a topside (74) having a groove (72), wherein the second guiding device (70) includes the groove (72), in which the groove cam (90) is moveable in a sliding manner.

Clause 5. The rack device (10) of any of clauses 1 to 4, wherein each of the depth supports (28) substantially extends across an overall depth of the storage location (24).

Clause 6. The rack device (10) of any of clauses 1 to 5, further comprising a plurality of rack posts (14) and a plurality of shelves (20), wherein the shelves (20) can be connected to the rack posts (24) along a height grid (HR), and wherein each of the depth supports (28) is connectable to each of the shelves (20) along a storage-location grid (LR).

Clause 7. The rack device (10) of clause 6, wherein each of the shelves (20) includes a plurality of slots (82), wherein each of the depth supports (28) includes a plurality of locking cams (80), wherein the slots (82) are arranged along the storage-location grid (LR), and wherein the slots (82) and the locking cams (80) are adapted to each other such that the locking cams (80) are releasibly lockable in the slots (82).

Clause 8. The rack device (10) of any of clauses 1 to 7, wherein each of the depth supports (28) includes a, preferably linear, rail element (92) and a, preferably wedge-shaped, inserting element (92), wherein the inserting element (94) is arranged flush at a rack-aisle side adjacent to the rail element (92), and wherein the inserting element (94) tapers towards a rack aisle (46).

Clause 9. The rack device (10) of clause 8, wherein the rail element includes a groove (72), and wherein the inserting element (94) includes a groove (72') transitioning flush into each other, wherein the groove (72') of the inserting element (94) preferably broadens towards the rack aisle (46) and descends, or declines.

Clause 10. The rack device (10) of any of clauses 1 to 9, wherein each of the depth supports (28) has a width (B1) being greater than a width (B2) of the gripping arm (56).

Clause 11. A load-handling device (54) of a storage and retrieval device (42), wherein the LHD includes a second guiding device (70) cooperating with the first guiding device (64) of the rack device (10) of any of clauses 1 to 10 so that the gripping arm (56) can store and retrieve the storage goods (26), without a width adjustment of the gripping arms (56), safely in and safely from the storage locations (24).

Clause 12. A system (40) comprising at least one rack device (10) of any of clauses 1 to 10 and a storage and retrieval device having a load-handling device of clause 11.

LIST OF REFERENCE NUMERALS

10 Rack device
12 Rack
14 (Rack) post
16 (longitudinal) traverse
18 (transversal) traverse
20 (Rack) shelf
21 Grating
22 Rack compartment (dashed line)
H1 Height of 22
HR Height grid
24 Storage location
T Depth of 24
L Length of 24
LR Storage-location grid LR
26 Storage good
RE Rack plane
28 Depth support, rib-shaped
40 System
42 Storage and retrieval device
44 Shuttle
46 Rack aisle
48 Movement of 44
50 Travelling rails
52 Travelling wheels
54 Load-handling device (LHD)
56 Gripping arms
57 Movement of 56
58 Gripping device
60 Pin
62 Movement of 60
64 First guiding device
66 (Guiding) wheel
68 (Rotation) axis
70 Second guiding device
72 Groove
74 Topside of 28
76 Lateral wall or side of 28
78 Front side von 28
80 Locking cam
82 Slots in 20
88 Arrow (inserting movement)
90 Groove cam
92 Rail element, linear
94 Inserting element, wedge-shaped
96 Groove width
98 Groove bottom

I claim:

1. A rack device for storing and retrieving storage goods in and from rack compartments, wherein the storage and retrieval is performed automatically by way of a storage and retrieval device, wherein the storage and retrieval device comprises a load-handling device having two gripping arms that are arranged distanced to each other in a longitudinal direction, wherein the two gripping arms are moveable in a depth direction of the rack compartments and each comprises a gripping device which allows the storage goods to be moved, in an active position of the respective gripping devices, along the depth direction into the rack compartments and to be removed from the rack compartments, wherein the two gripping arms each comprises a first guiding device, wherein the rack device comprises:

a plurality of rack compartments, wherein each of the rack compartments comprises a shelf and at least two depth supports extending along the depth direction and being arranged distanced to each other in a longitudinal direction of the rack compartments, thereby defining a storage location therebetween;

wherein each of the depth supports comprises a second guiding device, which extends in the depth direction and which is configured to cooperate with the respective first guiding devices of the two gripping arms such that the gripping arms, during storage or retrieval, are in contact with the respective depth supports via the respective guiding devices and are guided in the depth direction in a moveable manner along the respective depth supports, wherein each of the depth supports projects from the shelf of the rack compartment in a height direction for keeping the storage goods laterally within the storage location.

2. The rack device of claim 1, wherein the respective first guiding devices each comprises a guiding wheel being supported rotatably on the respective gripping arm, and wherein each of the depth supports comprises a topside including a groove, wherein the second guiding device comprises the groove in which the guiding wheel is moveable in a guided manner.

3. The rack device of claim 1, wherein the respective first guiding devices are a groove cam, and wherein each of the depth supports includes a topside having a groove, wherein the second guiding device includes the groove, in which the groove cam is moveable in a sliding manner.

4. The rack device of claim 1, wherein each of the depth supports extends throughout an overall depth of the storage location.

5. The rack device of claim 1 further comprising a plurality of rack posts and a plurality of shelves, wherein the shelves are connectable to the rack posts along a height grid, and wherein each of the depth supports is connectable to each of the shelves along a storage-location grid.

6. The rack device of claim 5, wherein each of the shelves includes a plurality of slots, wherein each of the depth supports comprises a plurality of locking cams, wherein the slots are arranged along a storage-location grid, and wherein the slots and the locking cams are adapted to each other such that the locking cams are releasibly lockable in the slots.

7. The rack device of claim 1, wherein each of the depth supports comprises a rail element and an inserting element, wherein the inserting element is arranged at an rack-aisle side flush adjacent to the rail element, and wherein the inserting element tapers towards a rack aisle.

8. The rack device of claim 7, wherein the rail element comprises a first groove, and wherein the inserting element comprises a second groove transitioning flush into each other.

9. The rack device of claim 8, wherein the second groove of the inserting element broadens and descends towards the rack aisle.

10. The rack device of claim 1, wherein each of the depth supports comprises a first width being greater than a second width of the gripping arm.

11. The rack device of claim 1, wherein each of the depth supports comprises a groove, wherein the second guiding device of each of the depth supports comprises the groove, and wherein the respective first guiding devices are guidably movable in the respective grooves.

12. A system including at least one rack device and a storage and retrieval device having a load-handling device,
wherein the rack device is configured for storing and retrieving storage goods in and from rack compartments of the rack device;
wherein the storage and retrieval is performed automatically by means of the storage and retrieval device, wherein the load-handling device has gripping arms that are arranged distanced to each other in a longitudinal direction, wherein each of the gripping arms is configured to be moveable in a depth direction of the rack compartments and comprises a gripping device allowing the storage goods to be moved, in an active position of the gripping device, along the depth direction into the rack compartments and to be removed from the rack compartments, and wherein each of the gripping arms comprises a first guiding device;
wherein the rack device comprises:
a plurality of the rack compartments, wherein each of the rack compartments comprises a shelf and at least two depth supports extending along the depth direction and being arranged distanced to each other in a longitudinal direction of the rack compartments, thereby defining a respective storage location therebetween;
wherein each of the depth supports comprises a second guiding device, which extends in the depth direction and which is configured to cooperate with the first guiding device of the gripping arm such that the gripping arm, during storage or retrieval, is in contact with the depth support via the guiding devices and is guided in the depth direction in a moveable manner along the depth support, wherein each of the depth supports projects from the shelf of the rack compartment in a height direction for keeping the storage goods laterally within the storage location
wherein the first guiding devices of the load-handling device are configured to cooperate with the second guiding devices of the rack device so that the gripping arms safely and securely store and retrieve the storage goods in and from the storage locations without width adjustment of the gripping arms.

13. A rack device for storing and retrieving storage goods in and from rack compartments, wherein the storage and retrieval is performed automatically by way of a storage and retrieval device, wherein the storage and retrieval device comprises a load-handling device having at least one gripping arm, wherein the gripping arm is moveable in a depth direction of the rack compartments and comprises a gripping device which allows the storage goods to be moved, in an active position of the gripping device, along the depth direction into the rack compartments and to be removed from the rack compartments, wherein the gripping arm comprises a first guiding device, wherein the rack device comprises:
a plurality of rack compartments, wherein each of the rack compartments comprises a shelf and at least two depth supports extending along the depth direction and being arranged distanced to each other in a longitudinal direction of the rack compartments, thereby defining a storage location therebetween;
wherein each of the depth supports comprises a second guiding device, which extends in the depth direction and which is configured to cooperate with the first guiding device of the gripping arm such that the gripping arm, during storage or retrieval, is in contact with the depth support via the guiding devices and is guided in the depth direction in a moveable manner along the depth support, wherein each of the depth supports projects from the shelf of the rack compartment in a height direction for keeping the storage goods laterally within the storage location, and
wherein the first guiding device comprises a guiding wheel being supported rotatably on the gripping arm, and wherein each of the depth supports comprises a topside including a groove, wherein the second guiding device comprises the groove in which the guiding wheel is moveable in a guided manner.

14. A rack device for storing and retrieving storage goods in and from rack compartments, wherein the storage and retrieval is performed automatically by way of a storage and retrieval device, wherein the storage and retrieval device comprises a load-handling device having at least one gripping arm, wherein the gripping arm is moveable in a depth direction of the rack compartments and comprises a gripping device which allows the storage goods to be moved, in an active position of the gripping device, along the depth direction into the rack compartments and to be removed from the rack compartments, wherein the gripping arm comprises a first guiding device, wherein the rack device comprises:

a plurality of rack compartments, wherein each of the rack compartments comprises a shelf and at least two depth supports extending along the depth direction and being arranged distanced to each other in a longitudinal direction of the rack compartments, thereby defining a storage location therebetween;

wherein each of the depth supports comprises a second guiding device, which extends in the depth direction and which is configured to cooperate with the first guiding device of the gripping arm such that the gripping arm, during storage or retrieval, is in contact with the depth support via the guiding devices and is guided in the depth direction in a moveable manner along the depth support, wherein each of the depth supports projects from the shelf of the rack compartment in a height direction for keeping the storage goods laterally within the storage location, and wherein the first guiding device is a groove cam, and wherein each of the depth supports includes a topside having a groove, wherein the second guiding device includes the groove, in which the groove cam is moveable in a sliding manner.

15. A rack device for storing and retrieving storage goods in and from rack compartments, wherein the storage and retrieval is performed automatically by way of a storage and retrieval device, wherein the storage and retrieval device comprises a load-handling device having at least one gripping arm, wherein the gripping arm is moveable in a depth direction of the rack compartments and comprises a gripping device which allows the storage goods to be moved, in an active position of the gripping device, along the depth direction into the rack compartments and to be removed from the rack compartments, wherein the gripping arm comprises a first guiding device, wherein the rack device comprises:

a plurality of rack compartments, wherein each of the rack compartments comprises a shelf and at least two depth supports extending along the depth direction and being arranged distanced to each other in a longitudinal direction of the rack compartments, thereby defining a storage location therebetween;

wherein each of the depth supports comprises a second guiding device, which extends in the depth direction and which is configured to cooperate with the first guiding device of the gripping arm such that the gripping arm, during storage or retrieval, is in contact with the depth support via the guiding devices and is guided in the depth direction in a moveable manner along the depth support, wherein each of the depth supports projects from the shelf of the rack compartment in a height direction for keeping the storage goods laterally within the storage location, the rack device further comprising a plurality of rack posts and a plurality of shelves, wherein the shelves are connectable to the rack posts along a height grid, and wherein each of the depth supports is connectable to each of the shelves along a storage-location grid.

* * * * *